(12) United States Patent
Seo et al.

(10) Patent No.: US 12,468,069 B2
(45) Date of Patent: Nov. 11, 2025

(54) WINDOW AND ELECTRONIC DEVICE INCLUDING THE SAME

(71) Applicant: Samsung Display Co., Ltd., Yongin-si (KR)

(72) Inventors: Inseok Seo, Asan-si (KR); Hansol Kang, Hwaseong-si (KR); Namhee Park, Hwaseong-si (KR); Sang-Il Park, Yongin-si (KR); Youngsang Park, Seoul (KR); Sungguk An, Suwon-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 626 days.

(21) Appl. No.: 17/876,886

(22) Filed: Jul. 29, 2022

(65) Prior Publication Data
US 2023/0184998 A1   Jun. 15, 2023

(30) Foreign Application Priority Data
Dec. 14, 2021 (KR) .................. 10-2021-0178254

(51) Int. Cl.
*G02B 1/11* (2015.01)
*G02B 1/04* (2006.01)
*G02B 1/14* (2015.01)
*G06F 1/16* (2006.01)

(52) U.S. Cl.
CPC .................. *G02B 1/11* (2013.01); *G02B 1/04* (2013.01); *G02B 1/14* (2015.01); *G06F 1/1652* (2013.01)

(58) Field of Classification Search
CPC .... G02B 1/11; G02B 1/04; G02B 1/14; G06F 1/1652; C08J 7/046; C08J 2301/12; C08J 2367/02; C08J 2369/00; C08J 2377/00; C08J 2379/08; C08J 7/0423; C08J 7/04; G09F 9/301; C09D 1/00
See application file for complete search history.

(56) References Cited

U.S. PATENT DOCUMENTS

| | | |
|---|---|---|
| 6,583,935 B1 | 6/2003 | Saif et al. |
| 6,660,388 B2 | 12/2003 | Liu et al. |
| 7,486,019 B2 | 2/2009 | Padiyath et al. |
| 9,688,051 B2 | 6/2017 | Min et al. |
| 10,361,383 B2 | 7/2019 | Heo et al. |
| 10,809,421 B2 | 10/2020 | Song et al. |
| 2013/0155373 A1* | 6/2013 | Cado .................. G02C 7/02 351/159.01 |
| 2013/0265477 A1* | 10/2013 | Furusato .............. G02B 1/14 348/335 |
| 2016/0154254 A1* | 6/2016 | Bolshakov ............ G02B 1/115 351/159.66 |

(Continued)

FOREIGN PATENT DOCUMENTS

| | | |
|---|---|---|
| JP | 3411009 B2 | 5/2003 |
| KR | 10-1329218 B1 | 11/2013 |

(Continued)

*Primary Examiner* — Balram T Parbadia
(74) *Attorney, Agent, or Firm* — CANTOR COLBURN LLP

(57) ABSTRACT

A window includes a base layer and an inorganic layer which is on the base layer. The inorganic layer includes silicon oxide and aluminum oxide which is in a content of about 1 wt % or more and less than about 10 wt % with respect to about 100 wt % of the silicon oxide.

20 Claims, 9 Drawing Sheets

(56) References Cited

U.S. PATENT DOCUMENTS

2019/0315105 A1* 10/2019 Isojima .................... G02B 1/14
2021/0116968 A1* 4/2021 He ........................ B32B 27/308
2021/0333440 A1 10/2021 Kim et al.
2023/0097067 A1* 3/2023 Jung ..................... C08J 7/0427
                                                              428/336

FOREIGN PATENT DOCUMENTS

| KR | 1020180044189 A | 5/2018 |
| KR | 10-2247137 B1 | 5/2021 |
| KR | 10-2298373 B1 | 9/2021 |
| KR | 10-2311060 B1 | 10/2021 |

* cited by examiner

WINDOW AND ELECTRONIC DEVICE INCLUDING THE SAME

This U.S. non-provisional patent application claims priority to Korean Patent Application No. 10-2021-0178254, filed on Dec. 14, 2021, and all the benefits accruing therefrom under 35 U.S.C. § 119, the entire contents of which are hereby incorporated by reference.

BACKGROUND

(1) Field

The present disclosure herein relates to a window and an electronic device including the same. More particularly, the present disclosure relates to a window including an inorganic layer and an electronic device including the same.

(2) Description of the Related Art

Various electronic devices used in multimedia devices such as televisions, cellular phones, tablet computers, navigation devices, and game machines are being developed. In particular, to be easily carried and improve a use thereof, an electronic device that is foldable or rollable by including a bendable flexible display member is under development.

SUMMARY

A polymer film is used as a base material for a window that protects a display surface of an electronic device so as to achieve flexible properties. However, the optical properties and impact resistance of the window are deteriorated when the polymer film is used.

The present disclosure provides a window with both improved optical properties and impact resistance.

The present disclosure also provides an electronic device which exhibits improved display quality and durability by including a window with both improved optical properties and impact resistance.

An embodiment of the invention provides a window which includes a base layer and an inorganic layer which is on at least one of upper or below the base layer, the inorganic layer including silicon oxide and aluminum oxide which is in a content of about 1 weight percent (wt %) or more and less than about 10 wt % with respect to about 100 wt % of the silicon oxide.

In an embodiment, the inorganic layer may have a thickness of about 40 nanometers (nm) to about 90 nm.

In an embodiment, the inorganic layer may be directly on an upper surface of the base layer.

In an embodiment, the window may further include a hard coating layer below the base layer.

In an embodiment, the inorganic layer may be directly on an upper surface of the base layer, and the hard coating layer may be directly on a lower surface of the base layer.

In an embodiment, the inorganic layer may be below the base layer, and the hard coating layer may be between the base layer and the inorganic layer.

In an embodiment, the inorganic layer may include an upper inorganic layer directly on an upper surface of the base layer and a lower inorganic layer directly on a lower surface of the base layer.

In an embodiment, the base layer may be a polymer film layer.

In an embodiment, the base layer may include polyimide, polyethylene terephthalate, polyamide, polycarbonate, or triacetylcellulose.

In an embodiment, the base layer may have a thickness of about 50 micrometers ($\mu$m) to about 100 $\mu$m.

In an embodiment, the window may have a transmittance of about 90% or more in a visible light range, together with a haze value of about 1.5% or less, and a yellow index of about 2.0 or less.

In the other embodiment of the invention, an electronic device includes a display module and a window which is on the display module. The window includes a base layer and an inorganic layer which is on at least one of upper or below the base layer, the inorganic layer including silicon oxide and aluminum oxide which is in a content of about 1 wt % or more and less than about 10 wt % with respect to about 100 wt % of the silicon oxide.

In an embodiment, the inorganic layer may have a thickness of about 40 nm to about 90 nm.

In an embodiment, the window may further include a hard coating layer below the base layer.

In an embodiment, the inorganic layer may be directly on an upper surface of the base layer, and the hard coating layer may be directly on a lower surface of the base layer.

In an embodiment, the inorganic layer may be below the base layer, and the hard coating layer may be between the base layer and the inorganic layer.

In an embodiment, the base layer may be a polymer film including polyimide, polyethylene terephthalate, polyamide, polycarbonate, or triacetylcellulose.

In an embodiment, the electronic device may further include a protective layer on the window, where the protective layer may include polymer resin of polyethylene terephthalate, polybutylene terephthalate, polyethylene naphthalene, polycarbonate, polymethyl methacrylate, polystyrene, polyvinyl chloride, polyether sulfone, polypropylene, polyamide, polyphenylene ether, polyoxymethylene, polysulfone, polyphenylene sulfide, polyimide, polyethyleneimine, polyetheretherketone, polyamideimide, polyarylate, or thermoplastic polyurethane.

In an embodiment of the invention, an electronic device, which is divided into a folding region folded with respect to a folding axis extending in one direction, and a non-folding region which is adjacent to the folding region, includes a display module, a support module below the display module, and a window on the display module, where the window includes a base layer and an inorganic layer at least one of upper or below the base layer, the inorganic layer including silicon oxide and aluminum oxide in a content of about 1 wt % or more and less than about 10 wt % with respect to about 100 wt % of the silicon oxide, together with a thickness of about 40 nm to about 90 nm.

In an embodiment, the window may have a transmittance of about 90% or more in a visible light range, together with a haze value of about 1.5% or less, and a yellow index of about 2.0 or less.

BRIEF DESCRIPTION OF THE FIGURES

The accompanying drawings are included to provide a further understanding of the invention, and are incorporated in and constitute a part of this specification. The drawings illustrate embodiments of the invention and, together with the description, serve to explain principles of the invention.

In the drawings.

DETAILED DESCRIPTION

Figure 1A:
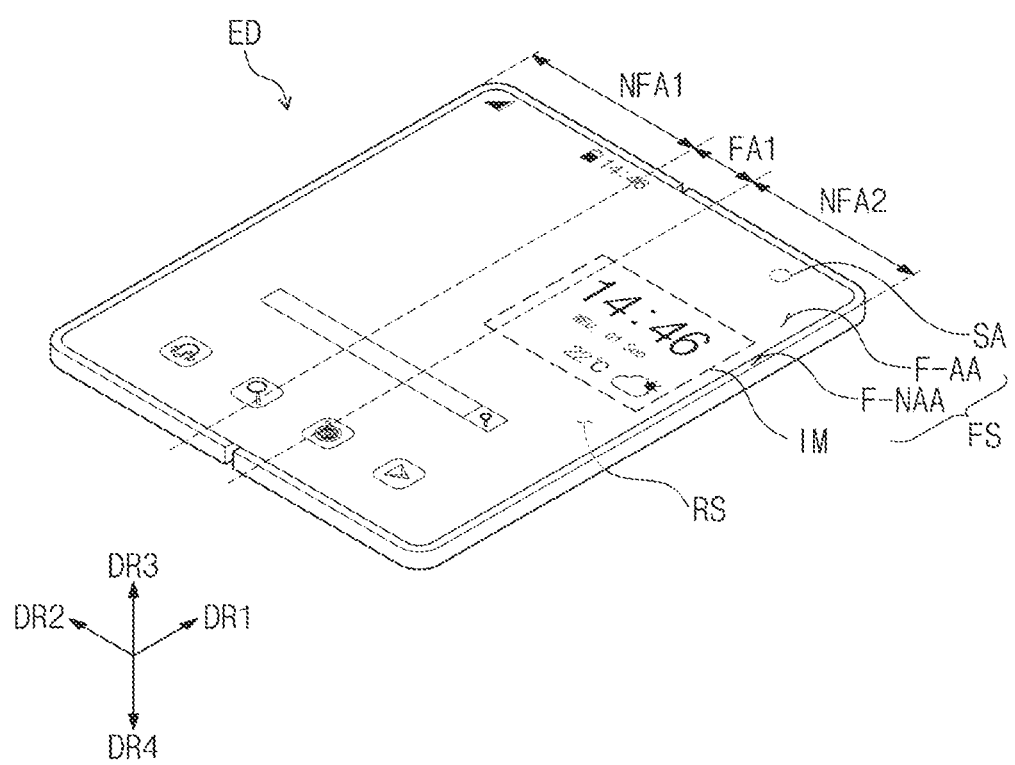
FIG. 1A is a perspective view illustrating an unfolded state of an electronic device according to an embodiment.

As the invention allows for various changes and numerous embodiments, particular embodiments will be illustrated in the drawings and described in detail in the following description. However, this is not intended to limit the embodiments of the invention to specific embodiments, and it should be understood to include all changes, equivalents, and substitutes included in the spirit and scope of the invention.

It will be understood that when an element (or a region, a layer, a portion, etc.) is referred to as being related to another element such as being "on", "connected to" or "coupled to" another element, it can be directly disposed on, connected or coupled to the other element or intervening elements may be present therebetween.

Meanwhile, when an element is referred to as being related to another element such as being "directly on", it may mean that there are no additional layers, films, regions, plates, etc. between a layer, film, region, plate, etc. and another. For example, when an element is referred to as being "directly on", it may mean that there is no additional element such as an adhesion element between two layers or two elements.

Like reference numerals or symbols refer to like elements throughout. As used herein, a reference number may indicate a singular element or a plurality of the element. For example, a reference number labeling a singular form of an element within the drawing figures may be used to reference a plurality of the singular element within the text of specification.

In addition, in the drawings, the thickness, the ratio, and the dimensions of constituent elements are exaggerated for effective explanation of technical contents.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." The term "and/or" includes one or more combinations which may be defined by relevant elements.

It will be understood that, although the terms first, second, etc. may be used herein to describe various elements, these elements should not be limited by these terms. These terms are only used to distinguish one element from another element. Thus, a first element could be termed a second element without departing from the teachings of the present invention. Similarly, a second element could be termed a first element. As used herein, the singular forms are intended to include the plural forms as well, unless the context clearly indicates otherwise.

In addition, the terms "below", "beneath", "on" and "above" are used for explaining the relation of elements illustrated in the drawings. The terms are relative concept and are explained based on the direction illustrated in the drawing. "Disposed on" used herein may indicate a case of being disposed not only on but also below any one member.

It will be further understood that the terms "comprises" and/or "comprising," when used in this specification, specify the presence of stated features, numerals, steps, operations, elements, parts, or the combination thereof, but do not preclude the presence or addition of one or more other features, numerals, steps, operations, elements, parts, or the combination thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within +30%, 20%, 10% or 5% of the stated value.

Unless otherwise defined, all terms (including technical and scientific terms) used herein have the same meaning as commonly understood by one of ordinary skill in the art to which this invention belongs. Furthermore, it will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a window WM according to an embodiment of the invention and an electronic device ED according to an embodiment, which includes the window WM, will be described with reference to the accompanying drawings.

Figure 1B:
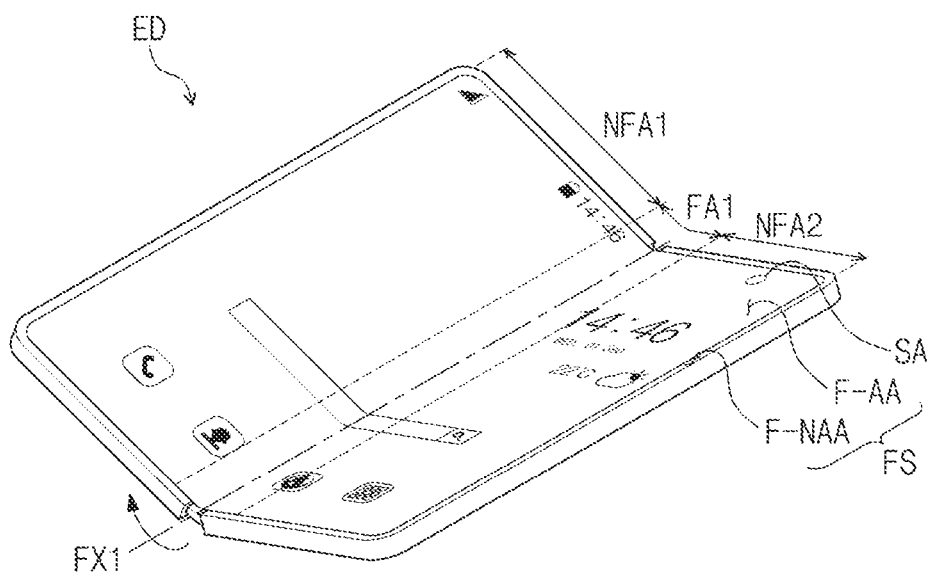
FIG. 1B is a perspective view illustrating a partially in-folded state of an electronic device according to an embodiment.
Figure 1B:
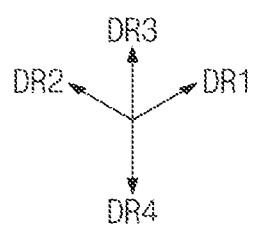
Figure 1C:
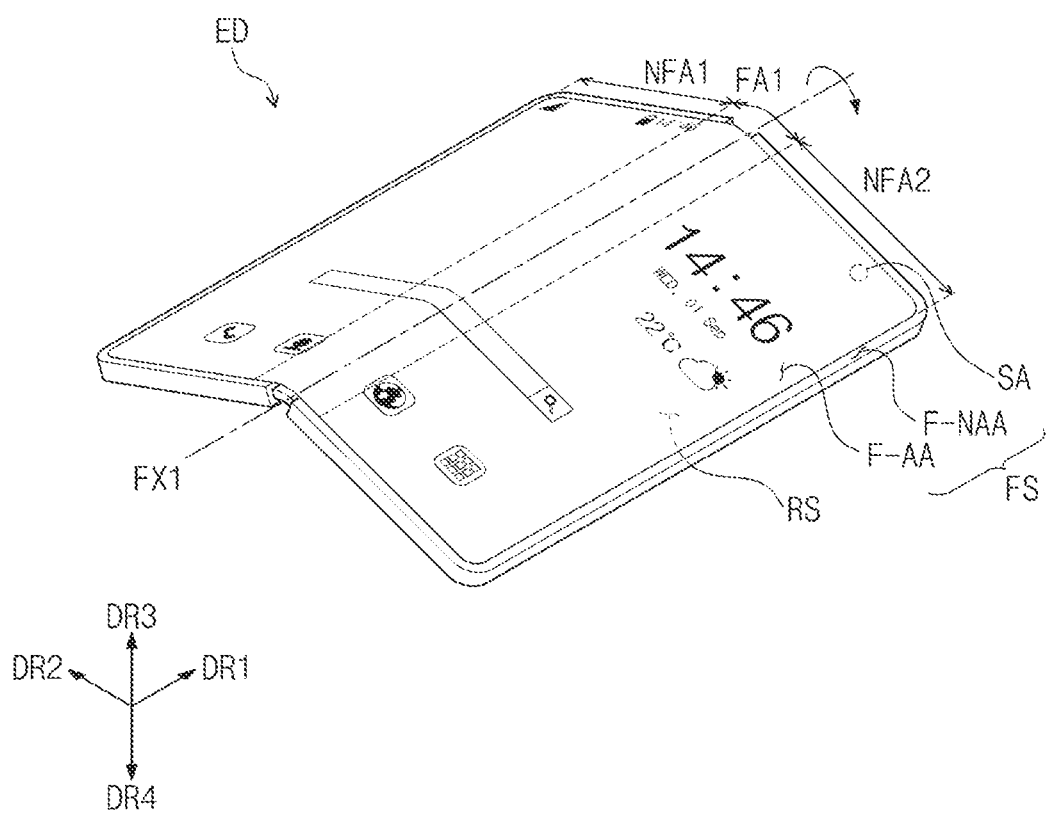
FIG. 1C is a perspective view illustrating an out-folded state of an electronic device according to an embodiment.

FIG. 1A is a perspective view illustrating an electronic device ED which is unfolded (e.g., in an unfolded state of an electronic device ED) according to an embodiment. FIG. 1B is a perspective view illustrating that the electronic device ED illustrated in FIG. 1A is partially in-folded. FIG. 1C is a perspective view illustrating that the electronic device ED illustrated in FIG. 1A is partially out-folded. Various components and layers of the electronic device ED may be foldable together with each other, in folding (or unfolding) of the electronic device ED.

The electronic device ED according to an embodiment may be a device activated in response to an electrical signal. For example, the electronic device ED may be a cellular phone, a tablet computer, an automobile navigation device, a game machine or a wearable device. However, an embodiment of the invention is not limited thereto. In this specification including FIG. 1A and the like, the electronic device ED is exemplarily illustrated as a cellular phone.

FIGS. 1A to 1C illustrate the electronic device ED as a foldable electronic device that is deformable to be deformed into a folded shape, but an embodiment of the invention is not limited thereto. The electronic device ED according to an embodiment may be a flexible electronic device that is bendable or rollable so as to be bent or rolled to have a deformed shape.

Meanwhile, FIG. 1A and drawings subsequent thereto illustrate first to fourth direction axes DR1 to DR4. Directions indicated by the first to fourth direction axes DR1 to DR4 described herein are relative concepts and may thus be changed into different directions. In addition, the directions indicated by the first to fourth direction axes DR1 to DR4 may be described as first to fourth directions, and the same reference numerals or symbols may be used therefor.

Referring to FIGS. 1A to 1C, the electronic device ED according to an embodiment may include a display surface FS (e.g., first display surface) defined by the first direction axis DR1 and the second direction axis DR2 crossing the first direction axis DR1 (e.g., in a plane defined by the first direction axis DR1 and the second direction axis DR2 crossing each other). The electronic device ED may provide an image IM through the display surface FS, to outside the electronic device ED, such as to a user thereof. The electronic device ED according to an embodiment may display an image IM in a direction of the third direction axis DR3 through the display surface FS parallel to each of the first direction axis DR1 and the second direction axis DR2. In this specification, a front surface (or upper surface) and a rear surface (or lower surface) of each component are defined based on a direction in which the image IM is displayed. In this specification, the direction in which the image IM is displayed may be defined as the direction of the third direction axis DR3, and a direction of the fourth direction axis DR4 may be defined as a direction opposed to the direction of the third direction axis DR3.

The electronic device ED according to an embodiment may sense an external input applied from the outside (e.g., outside of the electronic device ED). The external input may include various types of input applied from the outside. For example, the external input may include not only a touch made by a part of the body, such as a user's hand, but also an external input (for example, hovering) applied while being adjacent or close to the electronic device ED by a predetermined distance. In addition, the external input may have various forms such as a force, a pressure, a temperature, and light.

The display surface FS of the electronic device ED may include an active region F-AA and a peripheral region F-NAA. The active region F-AA may be a region activated in response to electrical signals. The electronic device ED according to an embodiment may display an image IM through the active region F-AA. In addition, the active region F-AA may sense various types of external inputs. The peripheral region F-NAA is adjacent to the active region F-AA. The peripheral region F-NAA may have a predetermined color. The peripheral region F-NAA may surround the active region F-AA. Accordingly, the shape of the active region F-AA may be substantially defined by the peripheral region F-NAA. However, this is an example, and the peripheral region F-NAA may be disposed adjacent to only one side of the active region F-AA or may be omitted. The electronic device ED according to an embodiment of the invention may include active regions having various shapes. However, an embodiment of the invention is not be limited to any one embodiment.

The active region F-AA may include a sensing region SA. Various electronic modules may be disposed in the sensing region SA. For example, an electronic module which provides a function of the electronic device ED (e.g., a functional component) may include at least one of a camera module, a speaker, a light detection sensor and a heat detection sensor. The sensing region SA may sense an external subject received through the display surface FS or provide sound signals such as voice through the display surface FS. The electronic module may include a plurality of components. However, an embodiment of the invention is not limited to any one embodiment.

The sensing region SA may be surrounded by the active region F-AA and the peripheral region F-NAA. However, an embodiment of the invention is not limited thereto, and the sensing region SA may be disposed in the active region F-AA. However, an embodiment of the invention is not limited to any one embodiment. FIG. 1A, etc., illustrates one sensing region SA as an example, but the number of sensing regions SA may not be limited thereto.

The sensing region SA may be a portion of the active region F-AA. Accordingly, the electronic device ED may display an image IM even in the sensing region SA. When electronic modules disposed in the sensing region SA are deactivated, the sensing region SA may serve as a display surface FS and display a video or an image IM.

A rear surface RS of the electronic device ED according to an embodiment may be a surface facing the display surface FS, such as being opposite to the display surface FS. In an embodiment, the rear surface RS is an external surface of the electronic device ED, and a video or an image IM may not be displayed therethrough. However, an embodiment of the invention is not limited thereto. The rear surface RS may function as a second display surface through which a video or an image IM is displayed. In addition, the electronic device ED according to an embodiment may further include a sensing region SA disposed in the rear surface RS. A camera, a speaker, a light detection sensor, and the like may also be disposed in the sensing region SA disposed in the rear surface RS.

The electronic device ED may include a folding region FA1 at which the electronic device ED is foldable, and a non-folding region which is adjacent to the folding region FA1. The non-folding region may include a plurality of non-folding regions NFA1 and NFA2. The electronic device ED according to an embodiment may include a first non-folding region NFA1 and a second non-folding region NFA2, with the folding region FA1 disposed therebetween. Meanwhile, FIGS. 1A to 1C illustrate an embodiment of the electronic device ED including one folding region FA1. However, an embodiment of the invention is not limited thereto. A plurality of folding regions may be defined in the electronic device ED. However, an embodiment of the invention is not limited thereto. The electronic device ED according to an embodiment may be folded with respect to a plurality of folding axes such that portions of the display surface FS face each other, and the number of the folding axes and the number of non-folding regions are not particularly limited thereto.

Referring to FIGS. 1B and 1C, the electronic device ED according to an embodiment may be folded with respect to a first folding axis FX1. The first folding axis FX1, illustrated in FIGS. 1B and 1C, is a virtual axis extending in the direction of the first direction axis DR1, and may be parallel to a longer side direction of the electronic device ED. However, an embodiment of the invention is not limited thereto, and an extending direction of the first folding axis FX1 is not limited to the direction of the first direction axis DR1.

The first folding axis FX1 may extend along the first direction axis DR1 and be on (or above) the display surface FS or extend along the first direction axis DR1 and be below the rear surface RS. Referring to FIG. 1B, in an embodiment, portions of the display surface FS corresponding to the first non-folding region NFA1 and the second non-folding region NFA2 may face each other, and the electronic device ED may be in-folded such that the display surface FS is not exposed to the outside. In addition, referring to FIG. 1C, the electronic device ED according to an embodiment may be folded with respect to the first folding axis FX1 and deformed into an out-folding state in which in the rear surface RS, one region overlapping the first non-folding region NFA1 and the other region overlapping the second non-folding region NFA2 face each other.

Figure 2A:
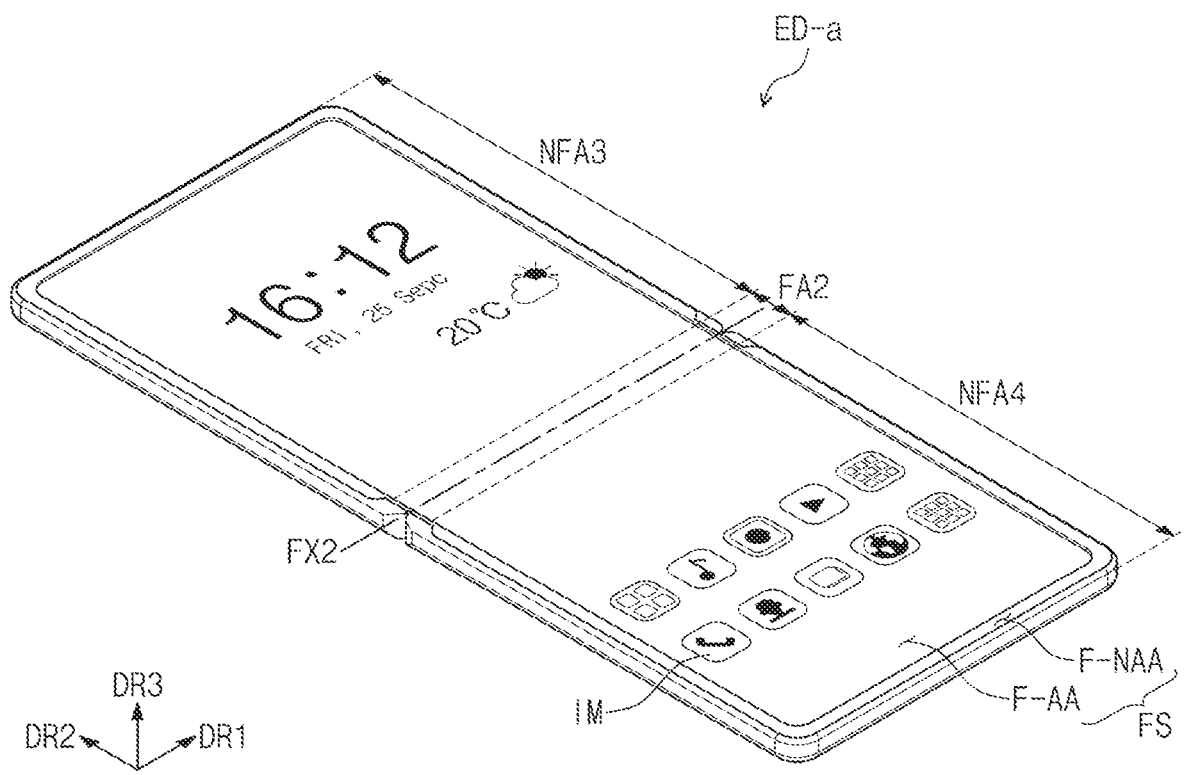
FIG. 2A is a perspective view illustrating an unfolded state of an electronic device according to an embodiment.
Figure 2B:
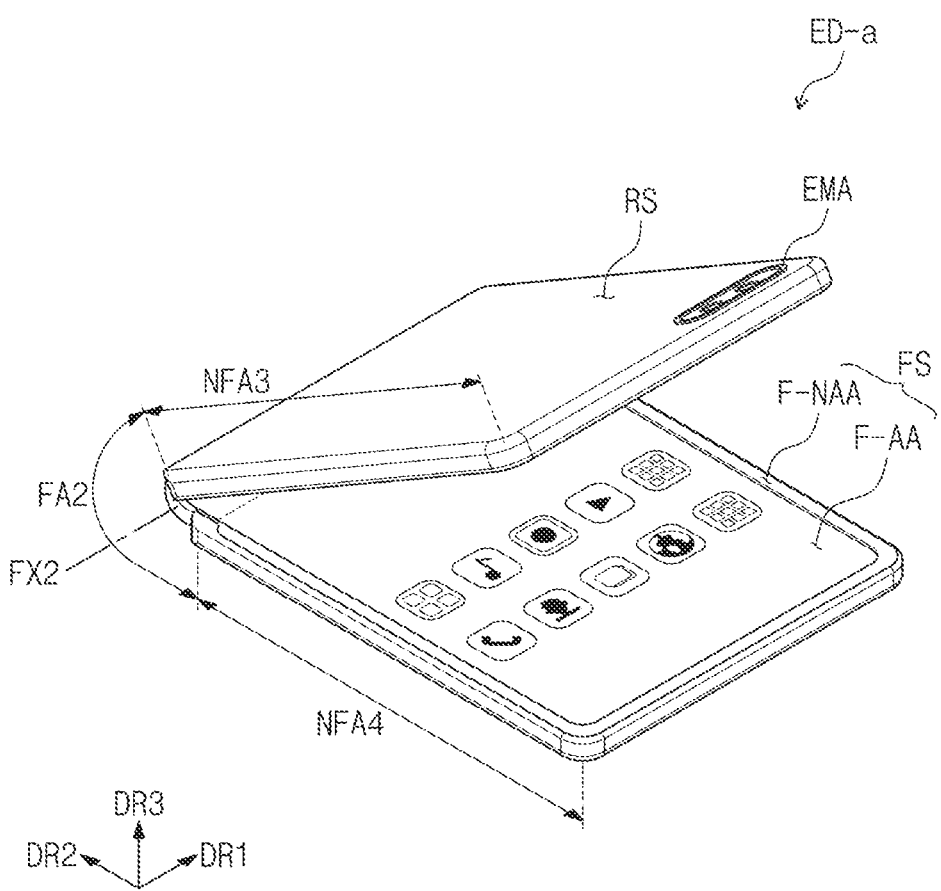
FIG. 2B is a perspective view illustrating a partially in-folded state of the electronic device according to an embodiment, illustrated in FIG. 2A.

FIG. 2A is a perspective view illustrating an unfolded state of an electronic device ED-a according to an embodiment. FIG. 2B is a perspective view illustrating that the electronic device ED-a illustrated in FIG. 2A is being in-folded.

An electronic device ED-a according to an embodiment may be folded with respect to the second folding axis FX2 extending in one direction parallel to the first direction axis DR1. In FIG. 2B, an extending direction of the second folding axis FX2 is in parallel with an extending direction of a shorter side of the electronic device ED-a. However, an embodiment of the invention is not limited thereto.

The electronic device ED-a according to an embodiment may include at least one folding region FA2 and non-folding regions NFA3 and NFA4 which are adjacent to the folding region FA2. The non-folding regions NFA3 and NFA4 may be spaced apart from each other with the folding region FA2 disposed therebetween.

The electronic device ED-a which is folded disposes the folding region FA2 to have a curvature and a radius of curvature. In an embodiment, the first non-folding region NFA3 and the second non-folding region NFA4 may face each other, and the electronic device ED-a may be in-folded such that the display surface FS is not exposed to the outside.

In addition, unlike the configuration illustrated herein, in an embodiment, the electronic device ED-a may be out-folded such that the display surface FS is exposed to the outside (e.g., facing in directions away from each other). Meanwhile, in an embodiment, the first display surface FS may be visible from outside the electronic device ED-a (e.g., to a user) when the electronic device ED-a is in a non-folded state (e.g., flat), and the second display surface RS may be visible to a user when the electronic device ED-a is in an in-folded. The second display surface RS may include an electronic module region EMA in which an electronic module having various components is disposed.

The electronic device ED-a according to an embodiment may include or define a second display surface RS, and the second display surface RS may be defined as a surface opposed to at least a portion of the first display surface FS. The second display surface RS may be visible to a user when the electronic device ED-a is in an in-folded state. The second display surface RS may include an electronic module region EMA in which an electronic module having various components is disposed. Meanwhile, in an embodiment, an image IM may be provided through the second display surface RS.

In an embodiment, the electronic devices ED and ED-a may be configured such that an in-folding operation or an out-folding operation from an unfolding operation is repetitively performed. However, an embodiment of the invention is not limited thereto. In an embodiment, the electronic devices ED and ED-a may be configured to select one among an unfolding operation, an in-folding operation and an out-folding operation.

FIGS. 1A to 2B illustrate the electronic devices ED and ED-a as foldable electronic devices that are foldable to be deformed into a folded shape, but an embodiment of the invention is not limited thereto. The electronic device ED according to an embodiment may be a flexible electronic device that is bendable or rollable to be bent or rolled to have a deformable shape.

Figure 3:
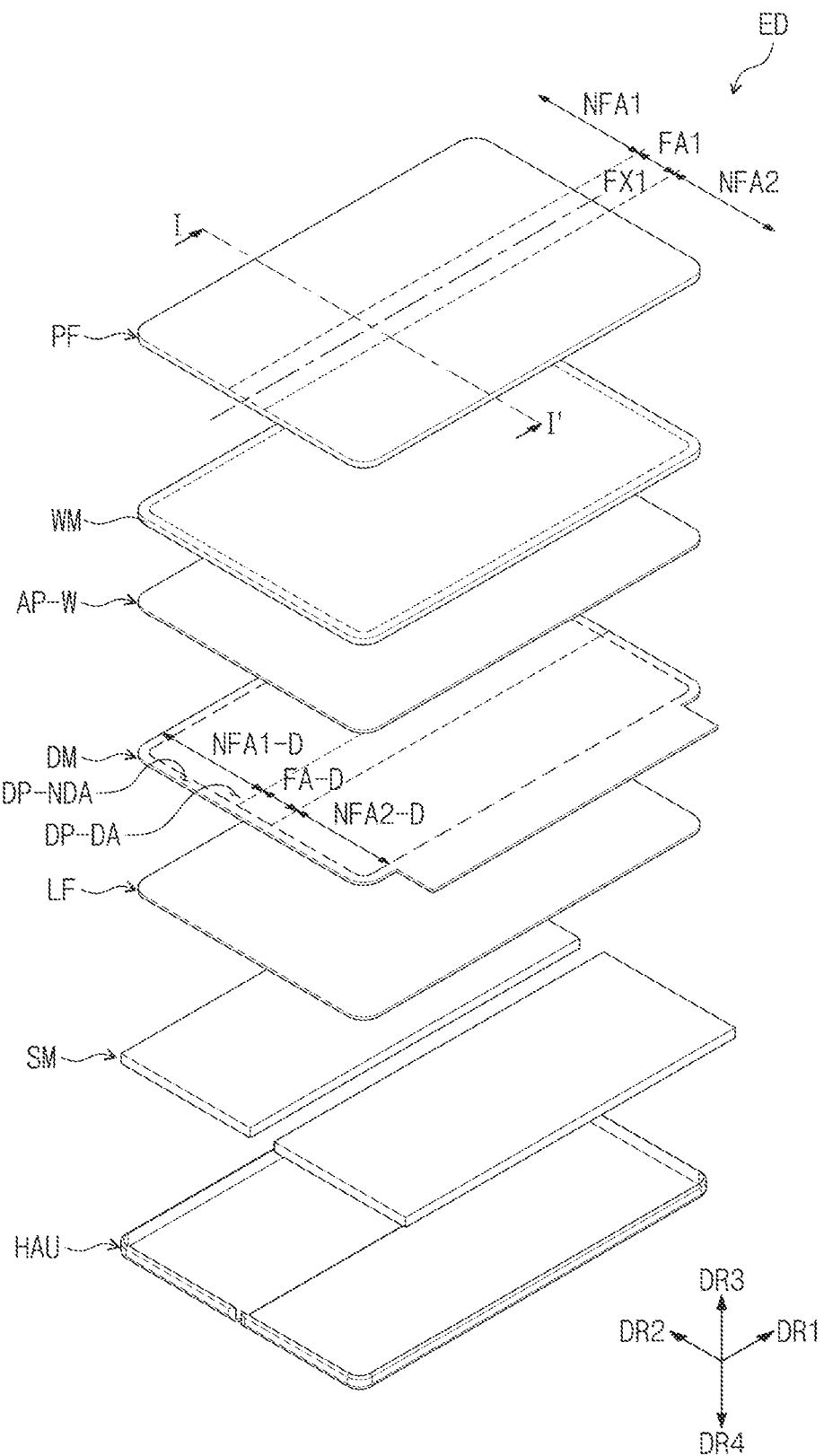
FIG. 3 is an exploded perspective view of an electronic device according to an embodiment.
Figure 4:
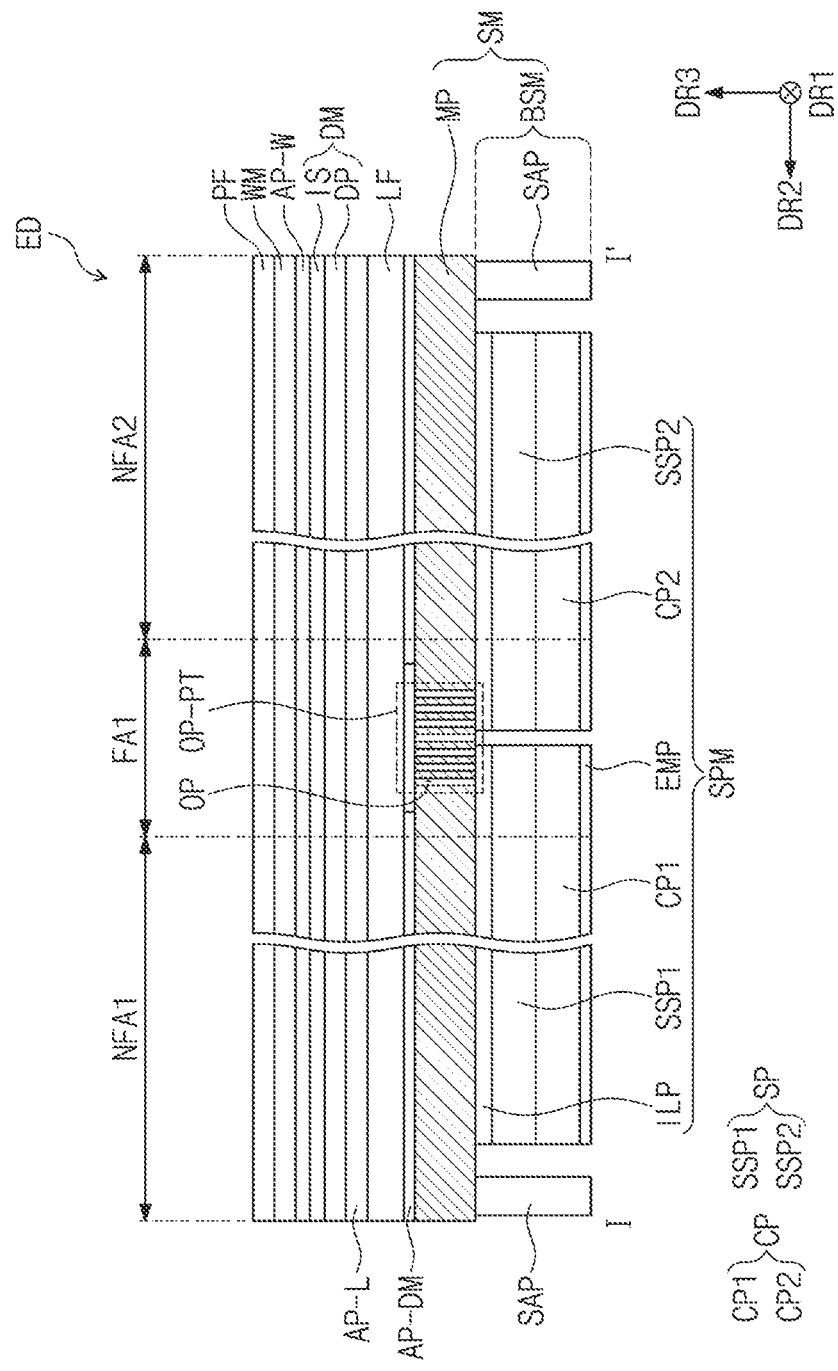
FIG. 4 is a cross-sectional view of an electronic device according to an embodiment.

FIG. 3 is an exploded perspective view of an electronic device ED according to an embodiment, and FIG. 4 is a cross-sectional view of an electronic device ED according to an embodiment. FIG. 3 exemplarily illustrates the exploded perspective view of the electronic device ED according to an embodiment, illustrated in FIG. 1A. FIG. 4 is a cross-sectional view illustrating a portion taken along line I-I' of FIG. 3.

Referring to FIGS. 3 and 4, the electronic device ED according to an embodiment may include a display module DM and a window WM which is disposed on and facing the display module DM. In an embodiment, the display module DM may be considered an electronic display device, and the window WM may be disposed on such electronic display device. In addition, the electronic device ED according to an embodiment may include a support module SM which is disposed below the display module DM to face the display module DM, and a protective layer PF which is disposed on the window WM to face the window WM. In an embodiment, the protective layer PF may be omitted. In FIGS. 3 and 4, the electronic device ED illustrated in FIGS. 1A to 1C has been described as an embodiment, but the same description explained below may be applied to the electronic device ED-a illustrated in FIGS. 2A and 2B.

The window WM may cover the entire outer side of the display module DM (e.g., an entirety of the display module DM). The window WM may have a shape (e.g., planar shape) corresponding to that of the display module DM, such as in a plan view (e.g., a view along the third direction axis DR3). In addition, the electronic device ED according to an embodiment may include a housing HAU that accommodates the display module DM and the support module SM. The housing HAU may be coupled to the window WM. Although not illustrated, the housing HAU may further include a hinge structure to facilitate folding or bending of the electronic device ED.

In the electronic device ED according to an embodiment, the display module DM may display an image IM in response to an electrical signal and transmit/receive information about an external input. The display module DM may include a display region DP-DA and a non-display region DP-NDA. The display region DP-DA may be defined as a region in which an image IM provided by the display module DM is output.

The non-display region DP-NDA is adjacent to the display region DP-DA. For example, the non-display region DP-NDA may surround the display region DP-DA. However, this is an example, and the non-display region DP-NDA may be defined in various shapes, and an embodiment of the invention is not limited to any one embodiment. According to an embodiment, the display region DP-DA of the display module DM may correspond to at least a portion of the active region F-AA (FIG. 1A).

In the electronic device ED according to an embodiment, the display module DM may include a folding display part FA-D and a non-folding display part provided in plural including non-folding display parts NFA1-D and NFA2-D. The folding display part FA-D may be a portion corresponding to the folding region FA1 (FIG. 1A), and the non-folding display parts NFA1-D and NFA2-D may be portions corresponding to the non-folding regions NFA1 and NFA2 (FIG. 1A).

A window WM according to an embodiment is disposed on the display module DM. The window WM may include an optically transparent insulating material. The window WM may protect a display panel DP, a sensor layer IS and the like. That is, the window WM may be a cover window that covers the top portion of the display module DM.

The image IM (FIG. 1A) generated by the display panel DP may be transmitted through the window WM and provided to outside the electronic device ED. The window WM may provide a touch surface of the electronic device ED. In the electronic device ED including the folding region FA1, the window WM may be a flexible window that may be folded together with other layers of the electronic device ED.

The window WM may be provided as a display surface FS and a touch surface and may exhibit excellent optical properties. The window WM according to an embodiment may have a high transmittance of about 90% or more in a visible light range of about 380 nanometers (nm) to about 780 nm. In addition, the window WM according to an embodiment may have a low haze value and a low yellow index. For example, the window WM according to an embodiment may have a haze value of about 1.5% or less and a yellow index of about 2.0 or less, together with the transmittance of about 90% or more in a visible light range of about 380 nm to about 780 nm.

Figure 5:
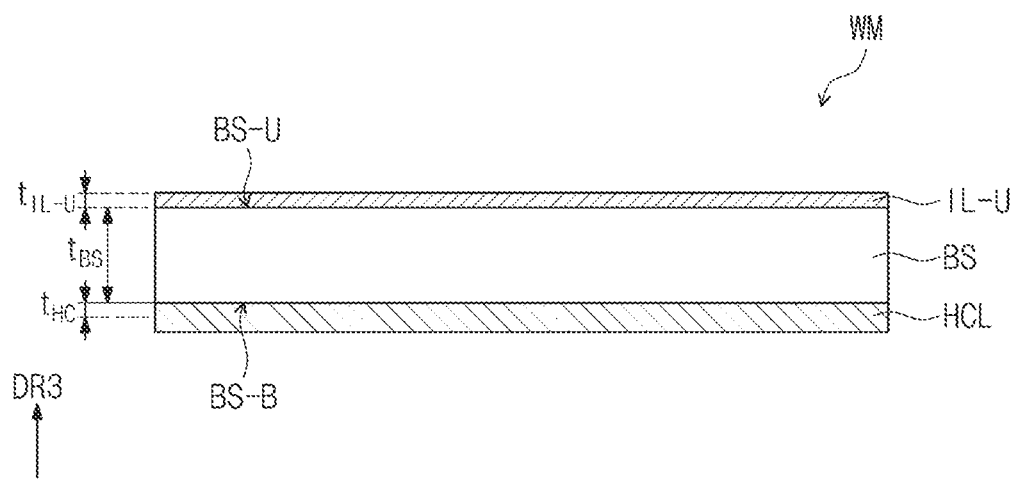
FIG. 5 is a cross-sectional view of a window according to an embodiment.

The window WM according to an embodiment may include a film-like base layer BS (FIG. 5) having flexibility and inorganic layers IL-U and IL-B (FIGS. 5 to 7) disposed at least one of upper and below the base layer BS (FIG. 5). The inorganic layers IL-U and IL-B (FIGS. 5 to 7) may function as optical primer layers that improve the optical properties of the window WM. The window WM according to an embodiment will be described in detail later. The inorganic layers IL-U and IL-B (FIGS. 5 to 7) may define an outermost surface (e.g., a first outer surface) of the window WM, without being limited thereto.

The display module DM may include the display panel DP and the sensor layer IS disposed on the display panel DP. In addition, although not illustrated, the display module DM may further include an optical layer (not shown) disposed on the sensor layer IS. The optical layer (not shown) may reduce reflection caused by external light. For example, the optical layer (not shown) may include a polarizing layer or a color filter layer.

The display panel DP may be a component that substantially generates an image IM. For example, the display panel DP may be an organic light-emitting display panel, an inorganic light-emitting display panel, a quantum dot display panel, a micro light-emitting diode (LED) display panel, a nano LED display panel or a liquid crystal display layer. The display panel DP may be referred to as a display layer.

The sensor layer IS may be disposed on the display panel DP. The sensor layer IS may sense an external input applied from the outside. The external input may be a user's input. The user's input may include various types of external input such as a part of a user's body, light, heat, a pen or pressure.

In the display module DM according to an embodiment, the sensor layer IS may be formed on the display panel DP through a consecutive process. In this case, the sensor layer IS may be represented as being directly disposed on the display panel DP. Being directly disposed may mean that a third component is not disposed between the sensor layer IS and the display panel DP, and such layers may form an interface therebetween. That is, a separate adhesive member may not be disposed between the sensor layer IS and the display panel DP. In addition, in an embodiment of the invention, the sensor layer IS and the display panel DP may be bonded to each other through an adhesive member. The adhesive member may include a typical adhesive or a typical bonding agent.

The protective layer PF may be disposed on the window WM. The protective layer PF may be a functional layer that protects an upper surface of the window WM.

The protective layer PF according to an embodiment may include at least one polymer resin of polyethyleneterephthalate (PET), polybutylene terephthalate (PBT), polyethylene naphthalene (PEN), polycarbonate (PC), polymethyl methacrylate (PMMA), polystyrene (PS), polyvinylchloride (PVC), polyethersulfone (PES), polypropylene (PP), polyamide (PA), modified polyphenylene ether (m-PPO), polyoxymethylene (POM), polysulfone (PSU), polyphenylene sulfide (PPS), polyimide (PI), polyethyleneimine, (PEI), polyether ether ketone (PEEK), polyamide imide (PAI), polyarylate (PAR) and thermoplastic polyurethane (TPU). The protective layer PF may be a polymer film layer, and for example, in an embodiment, the protective layer PF may be a polyethyleneterephthalate (PET) film or a thermoplastic polyurethane (TPU) film.

Meanwhile, the electronic device ED according to an embodiment may further include a protective layer adhesive layer (not shown). The protective layer adhesive layer (not shown) may be disposed between the window WM and the protective layer PF. The protective layer PF may be attached to the window WM by the protective layer adhesive layer (not shown). The protective layer adhesive layer (not shown) may include a silicon-based resin, an acrylic resin or a urethane-based resin. In addition, the protective layer PF may further include a material such as an anti-fingerprint coating agent, an anti-static agent, and a hard coating agent and may thus function as a functional layer. Meanwhile, the protective layer PF may have a multi-layered stacked structure and may further include a separate functional layer such as an anti-fingerprint coating layer, an anti-static coating layer, and a hard coating layer.

A window adhesive layer AP-W may be an optically clear adhesive film (OCA) or an optically clear adhesive resin layer (OCR).

The electronic device ED according to an embodiment may include a lower film LF disposed below the display module DM. The lower film LF may be disposed below the display module DM and protect a lower portion of the display panel DP. The electronic device ED according to an embodiment may include a lower adhesive layer AP-L which bonds the display module DM to the lower film LF.

The lower film LF may be a polymer film. For example, the lower film LF may include a polyethylene terephthalate (PET) film or a polyimide (PI) film. The lower film LF may prevent a scratch from occurring on a bottom surface of the display panel DP during a process of manufacturing (or providing) the display panel DP. In addition, the lower film LF protects the display panel DP against pressure applied from the outside and may thus prevent the deformation of the display panel DP. The lower film LF may have a structure in which a single film layer or a plurality of film layers are stacked.

The lower adhesive layer AP-L may be disposed between the display panel DP and the lower film LF. The lower adhesive layer AP-L may be an optically clear adhesive film (OCA) or an optically clear adhesive resin layer (OCR). However, an embodiment of the invention is not limited thereto, and the lower adhesive layer AP-L may include an acrylic adhesive or a silicon-based adhesive. In addition, in an embodiment, the lower adhesive layer AP-L may be omitted.

The electronic device ED according to an embodiment may include a support module SM disposed below the display module DM. The support module SM may include a support plate MP and a lower support member BSM.

The support plate MP may be disposed below the display module DM. In an embodiment, the support plate MP may include a metal material or a polymer material. For example, the support plate MP may be formed by including stainless steel, aluminum, or an alloy thereof. In addition, alternatively, the support plate MP may be formed of carbon fiber reinforced plastic (CFRP) and the like. However, an embodiment of the invention is not limited thereto, and the support plate MP may include a non-metal material, plastic, glass fiber reinforced plastic, or glass.

A plurality of openings OP may be defined in (or by) the support plate MP. The support plate MP may include an opening pattern OP-PT that includes the plurality of openings OP. The opening pattern OP-PT may correspond to the folding region FA1.

The lower support member BSM may include a support member SPM and a filling part SAP (e.g., compensation member). The support member SPM may be a portion overlapping (or corresponding to) the majority of the display module DM. The filling part SAP may be a portion disposed outside the support member SPM and overlapping an edge of the display module DM.

The lower support member BSM may include at least one of a support layer SP, a cushion layer CP, a shielding layer EMP and an interlayer bonding layer ILP. Meanwhile, a configuration of the lower support member BSM is not limited to those illustrated in FIG. 4 and the like and may vary according to the size and the shape of the electronic device ED or the operation characteristics and the like of the electronic device ED. For example, some of the support layer SP, the cushion layer CP, the shielding layer EMP, and the interlayer bonding layer ILP may be omitted or a stacked order thereof may be changed to an order different from that of FIG. 4, or an additional component other than the illustrated components may be further included. For example, the lower support member BSM may further include a digitizer and the like.

The support layer SP may include a metal material or a polymer material. The support layer SP may be disposed below the support plate MP. For example, the support layer SP may be a thin-film metal substrate.

The support layer SP may include a first sub support layer SSP1 and a second sub support layer SSP2 spaced apart from each other in the direction of the second direction axis DR2. The first sub support layer SSP1 and the second sub support layer SSP2 may be spaced apart from each other with respect to a portion corresponding to the folding axis FX1. That is, the support member SPM may be disconnected at the folding region FA1. The support layer SP is provided as the first sub support layer SSP1 and the second sub support layer SSP2 that are spaced apart from each other in the folding region FA1, and thus, the folding or bending properties of the electronic device ED may be improved.

The cushion layer CP may be disposed below the support layer SP. The cushion layer CP may prevent a pressing phenomenon and plastic deformation, of the support plate MP, caused by external shock and force. The cushion layer CP may improve the impact resistance of the electronic device ED. The cushion layer CP may include elastomer such as sponge, foam or a urethane resin. In addition, the cushion layer CP may be formed by including at least one of an acrylic polymer, a urethane-based polymer, a silicon-based polymer and an imide-based polymer. However, an embodiment of the invention is not limited thereto.

In addition, the cushion layer CP may include a first sub cushion layer CP1 and a second sub cushion layer CP2 spaced apart from each other in the direction of the second direction axis DR2. The first sub cushion layer CP1 and the second sub cushion layer CP2 may be spaced apart from each other in a portion corresponding to the folding axis FX1. The cushion layer CP is provided as the first sub cushion layer CP1 and the second sub cushion layer CP2 that are spaced part from each other in the folding region FA1, and thus, the folding or bending properties of the electronic device ED may be improved.

The shielding layer EMP may an electromagnetic shielding layer or a heat radiation layer. In addition, the shielding layer EMP may function as a bonding layer. The interlayer bonding layer ILP may bond the support plate MP to the lower support member BSM. The interlayer bonding layer ILP may be provided in the form of a bonding resin layer or an adhesive tape. FIG. 4 illustrates that the interlayer bonding layer ILP is divided into two portions spaced apart from each other in a portion corresponding to the folding region FA1. However, an embodiment of the invention is not limited thereto, and the interlayer bonding layer ILP may be provided as a single layer that is not divided in the folding region FA1.

The filling part SAP may be disposed on an edge of each of the support layer SP and the cushion layer CP. The filling part SAP may be disposed between the support plate MP and the housing HAU. The filling part SAP may fill a space between the support plate MP and the housing HAU and fix the support plate MP.

In addition, the electronic device ED according to an embodiment may further include a module adhesive layer AP-DM disposed between the display module DM and the support module SM. The module adhesive layer AP-DM may be an optically clear adhesive film (OCA) or an optically clear adhesive resin layer (OCR). Meanwhile, although not illustrated, an additional adhesive layer may be further disposed between respective members included in the support module SM.

Figure 6:
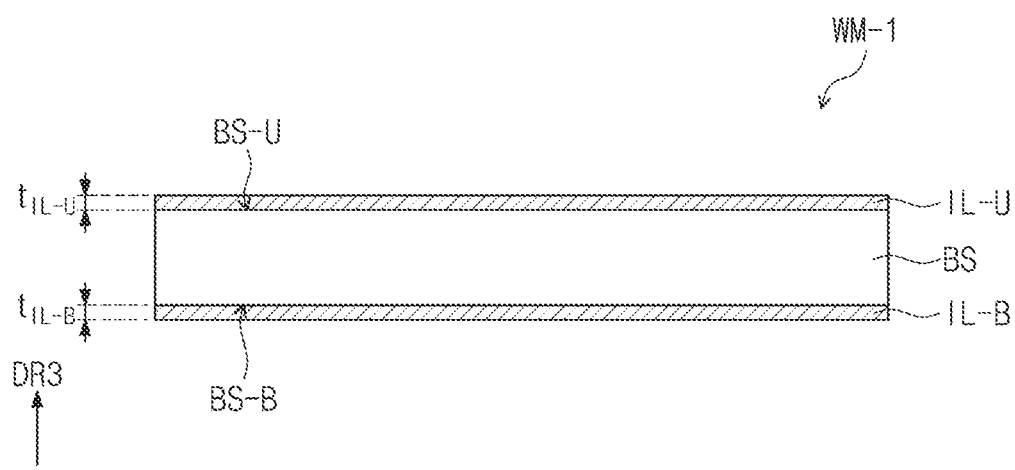
FIG. 6 is a cross-sectional view of a window according to an embodiment.
Figure 7:
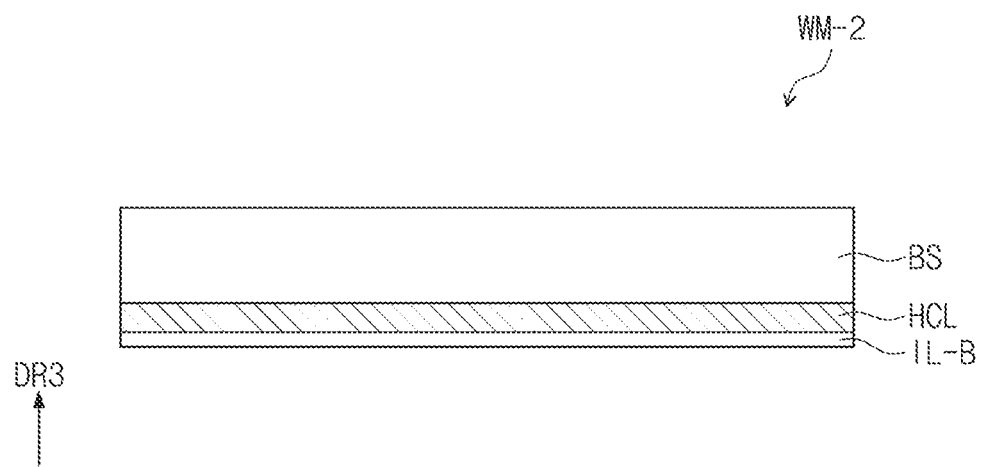
FIG. 7 is a cross-sectional view of a window according to an embodiment.

FIGS. 5 to 7 are each a cross-sectional view illustrating a window WM according to an embodiment. The window WM illustrated in FIG. 5 may be the window WM according to an embodiment, illustrated in FIGS. 3 and 4, and windows WM, WM-1, and WM-2 according to an embodiment, illustrated in FIGS. 5 to 7, may be used as cover windows of the electronic devices ED and ED-a according to an embodiment, described with reference to FIGS. 1A to 4. The windows WM, WM-1, and WM-2 according to an embodiment, illustrated in FIGS. 5 to 7, may each include a base layer BS and inorganic layers IL-U and IL-B disposed at least one of upper and below the base layer BS.

Referring to FIG. 5, the window WM according to an embodiment may include the base layer BS and the inorganic layer IL-U disposed on an upper surface of the base layer BS which is furthest from the display module DM. For example, the inorganic layer IL-U may be directly disposed on the upper surface of the base layer BS.

In the window WM according to an embodiment, the base layer BS may be a polymer film layer. The base layer BS may include at least one of polyimide (PI), polyethylene terephthalate (PET), polyamide (PA), polycarbonate (PC) and triacetyl cellulose (TAC). However, an embodiment of the invention is not limited thereto, and any material may be used in the base layer BS without limitation as long as the material is an optically transparent material having flexibility. For example, the window WM according to an embodiment may include a transparent polyimide film or a transparent polyethylene terephthalate film as the base layer BS.

The base layer BS has a thickness $t_{BS}$ (e.g., a first thickness) of about 50 micrometers (μm) to about 100 μm. When the thickness $t_{BS}$ of the base layer BS is less than about 50 μm, the base layer BS may not function as a supporting layer that provides the inorganic layer IL-U or may not protect the display module DM (FIG. 3) displayed therebelow. In addition, when the thickness $t_{BS}$ of the base layer BS is greater than about 100 μm, the overall thickness of the electronic device ED (FIG. 3) may increase. In particular, in the case that the electronic devices ED and ED-a are folded as illustrated in FIGS. 1A to 2B, the greater thickness of the base layer BS may cause the folding characteristics to be deteriorated.

The window WM according to an embodiment may include one base layer BS. In the window WM according to an embodiment, the base layer BS may be a single polymer film layer (e.g., monolayer). However, an embodiment of the invention is not limited thereto.

In an embodiment, the inorganic layer IL-U may include silicone oxide ($SiO_X$) and aluminum oxide ($Al_2O_3$). In addition, in the inorganic layer IL-U, a content of the aluminum oxide may be about 1 weight percent (wt %) or more and less than about 10 wt % with respect to about 100 wt % of the silicon oxide. For example, in the inorganic layer IL-U, the content of the aluminum oxide may be about 2 wt % to about 3 wt % with respect to about 100 wt % of the silicon oxide.

Meanwhile, in case of the silicon oxide $SiO_X$ included in the inorganic layer IL-U, X may satisfy a condition 0<X<3. For example, the silicon oxide may be $SiO_2$. However, an embodiment of the invention is not limited thereto.

When the window WM according to an embodiment includes both the silicon oxide and the aluminum oxide in the inorganic layer IL-U, and the aluminum oxide is included in an amount of about 1 wt % or more and less than 10 wt % with respect to the silicon oxide, the window WM may exhibit excellent optical properties such as a high transmittance, a low reflectance, a low haze value and a low yellow index. In addition, when the inorganic layer IL-U includes the aluminum oxide which is included in an amount of about 1 wt % or more and less than 10 wt % with respect to the silicon oxide, the window WM according to an embodiment may exhibit improved durability such as excellent impact resistance. That is, in an embodiment, the inorganic layer IL-U may improve optical properties of the base layer BS by including the aluminum oxide having no light absorption in a visible light range and a relatively high refractive index of about 1.8 to about 2.0 admixed with the silicon oxide. Meanwhile, when the aluminum oxide is included in an amount of about 2 wt % to about 3 wt % with respect to the silicon oxide, the window WM according to an embodiment may exhibit further improved optical properties and durability.

In an embodiment, the inorganic layer IL-U may have a thickness $t_{IL-U}$ (e.g., second thickness) of about 40 nm to about 90 nm. When the inorganic layer IL-U has a thickness ranging from about 40 nm to about 90 nm, the window WM according to an embodiment may exhibit excellent optical properties such as a high transmittance, a low reflectance, a low haze, and a low yellow index. In addition, the window WM according to an embodiment, including the inorganic layer IL-U having a thickness ranging from about 40 nm to about 90 nm may exhibit excellent impact resistance and enhanced durability.

That is, the window WM according to an embodiment includes the base layer BS having a polymer material and the inorganic layer IL-U which is disposed on the base layer BS and including both the silicon oxide and the aluminum oxide, thereby exhibiting excellent optical properties, superior impact resistance, and satisfactory folding properties. In addition, the window WM according to an embodiment may exhibit excellent optical properties and superior impact resistance when the inorganic layer IL-U has a thickness of about 40 nm to about 90 nm, and the aluminum oxide is included in an amount of about 1 wt % or more and about 10 wt % or less with respect to the silicon oxide.

The window WM according to an embodiment, including the base layer BS and the inorganic layer IL-U, may exhibit excellent optical properties such as a transmittance of about 90% or more in a visible light range, a haze value of about 1.5% or less, and a yellow index of about 2.0 or less.

The window WM according to an embodiment may further include a hard coating layer HCL disposed below the base layer BS. The hard coating layer HCL may protect the base layer BS or the display module DM (FIG. 3) of the window WM. The hard coating layer HCL may have a hardness which is higher than a hardness of the base layer BS and/or the display module DM, without being limited thereto. The hard coating layer HCL may define an outermost surface (e.g., a second outer surface) of the window WM, without being limited thereto.

In the window WM according to an embodiment, illustrated in FIG. 5, the inorganic layer IL-U may be directly disposed on an upper surface BS-U of the base layer BS and the hard coating layer HCL may be directly disposed on a lower surface BS-B of the base layer BS. However, the arrangement location of the hard coating layer HCL is not limited to those illustrated in FIG. 5 and the like, and the window WM according to an embodiment may further include a hard coating layer disposed on the upper side of the base layer BS.

The hard coating layer HCL may be formed from a layer of resin which has been hardened, such as including at least one of an organic composition, an inorganic composition and an organic-inorganic composite composition. For example, a hard coating agent used to form a hard coating layer may include at least one of an acrylate-based compound, a siloxane compound and a silsesquioxane compound. In addition, the hard coating agent may further include inorganic particles. The hard coating layer HCL may be an organic layer, an inorganic layer, or an organic-inorganic composite material layer.

In the window WM according to an embodiment, a thickness $t_{HC}$ (e.g., third thickness) of the hard coating layer HCL may be about 10 µm or less. For example, the thickness $t_{HC}$ of the hard coating layer HCL may be about 5 µm to about 10 µm. When the thickness $t_{HC}$ of the hard coating layer HCL is less than about 5 µm, the hard coating layer HCL may be less able to protect the base layer BS so that durability of the window WM may be deteriorated. In addition, when the thickness $t_{HC}$ of the hard coating layer HCL is less than about 5 µm, the hard coating layer HCL may not be able to exhibit sufficient surface hardness for the protection of the display module DM (FIG. 3). In addition, when the thickness $t_{HC}$ of the hard coating layer HCL is greater than about 10 µm, the window WM becomes thicker such that the window WM may not be suitable for the implementation of a thin electronic device, or a foldable electronic device.

In addition, in an embodiment, the hard coating layer HCL may have an elongation rate of about 3% or more. Since the hard coating layer HCL has an elongation rate of about 3% or more, the hard coating layer HCL may have flexibility and thus, the window WM including the same may exhibit satisfactory folding properties.

Referring to FIG. 6, a window WM-1 according to an embodiment may include a base layer BS, an upper inorganic layer IL-U disposed on the base layer BS, and a lower inorganic layer IL-B disposed below the base layer BS and closest to the display module DM. For example, in an embodiment, the upper inorganic layer IL-U may be directly disposed on an upper surface BS-U of the base layer BS and the lower inorganic layer IL-B may be directly disposed on a lower surface BS-B of the base layer BS. However, an embodiment of the invention is not limited thereto, and at least one functional layer may be further disposed between the upper inorganic layer IL-U and the base layer BS and between the lower inorganic layer IL-B and the base layer BS. Although not illustrated, the window WM-1 according to an embodiment may further include, for example, a hard coating layer (not shown) between the lower inorganic layer IL-B and the base layer BS. Meanwhile, a functional layer such as the hard coating layer (not shown) and the like may be disposed on the upper side of the upper inorganic layer IL-U or the lower side of the lower inorganic layer IL-B.

The same description for the base layer BS and the inorganic layer IL-U explained referring to FIG. 5 may be applied to the base layer BS, the upper inorganic layer IL-U, and the lower inorganic layer IL-B of the window WM-1 according to an embodiment, illustrated in FIG. 6.

In the window WM-1 according to an embodiment, the upper inorganic layer IL-U and the lower inorganic layer IL-B may each include silicon oxide ($SiO_x$) and aluminum oxide ($Al_2O_3$). In addition, in each of the upper inorganic layer IL-U and the lower inorganic layer IL-B, the aluminum oxide may be included in an amount of about 1 wt % or more and less than 10 wt % with respect to about 100 wt % of the silicon oxide. For example, in the inorganic layer IL-U, a content of the aluminum oxide may be about 2 wt % to about 3 wt % with respect to about 100 wt % of the silicon oxide.

In the window WM-1 according to an embodiment, the upper inorganic layer IL-U and the lower inorganic layer IL-B may independently have thicknesses $t_{IL-U}$ and $t_{IL-B}$ of about 40 nm to about 90 nm, respectively. The thickness $t_{IL-U}$ of the upper inorganic layer IL-U may be the same as the thickness $t_{IL-B}$ of the lower inorganic layer IL-B, but an embodiment of the invention is not limited thereto.

The window WM-1 may exhibit both excellent optical properties such as a high transmittance, a low reflectance, a low haze value, and a low yellow index, and durability such as excellent impact resistance when each of the upper inorganic layer IL-U and the lower inorganic layer IL-B includes both silicon oxide and aluminum oxide, the aluminum oxide is included in an amount of about 1 wt % or more and less than about 10 wt % with respect to the silicon oxide, and the upper inorganic layer IL-U and the lower inorganic layer IL-B have independently thicknesses $t_{IL-U}$ and $t_{IL-B}$ of about 40 nm to about 90 nm, respectively. In addition, the window WM-1 may exhibit satisfactory folding properties by including the base layer BS made of a polymer material and the upper inorganic layer IL-U and the lower inorganic layer IL-B each including both the silicon oxide and the aluminum oxide.

Referring to FIG. 7, a window WM-2 according to an embodiment may include a base layer BS and an inorganic layer IL-B disposed below the base layer BS. The window WM-2 according to an embodiment may further include a hard coating layer HCL disposed between the base layer BS and the inorganic layer IL-B.

The same description for the base layer BS, the inorganic layer IL-U, and the hard coating layer HCL explained referring to FIG. 5 may be applied to the base layer BS, the inorganic layer IL-B, and the hard coating layer HCL of the window WM-2 according to an embodiment, illustrated in FIG. 7.

In an embodiment, the hard coating layer HCL may be directly disposed on a lower surface of the base layer BS and the inorganic layer IL-B may be directly disposed on a lower surface of the hard coating layer HCL. However, an embodiment of the invention is not limited thereto, and the hard coating layer HCL may be disposed below the inorganic layer IL-B or the window WM-2 according to an embodiment may further include an additional hard coating layer (not shown) disposed on the upper side of the base layer BS in addition to the hard coating layer HCL disposed on the lower surface of the base layer BS. Meanwhile, as an alternative to the configuration illustrated in FIG. 7, the hard coating layer HCL disposed below the base layer BS may be omitted, and the window WM-2 according to an embodiment may include the base layer BS, the inorganic layer IL-B directly disposed on the lower surface of the base layer BS, and the hard coating layer HCL (not shown) disposed on an upper surface of the base layer BS.

That is, the window WM-2 according to an embodiment may exhibit both excellent optical properties such as a high transmittance, a low reflectance, a low haze value, and a low yellow index and durability such as excellent impact resistance when the inorganic layer IL-B disposed below the base layer BS includes both the silicon oxide and the aluminum oxide, the aluminum oxide is included in an amount of about 1 wt % or more and less than about 10 wt % with respect to the silicon oxide, and the inorganic layer IL-B has a thickness of about 40 nm to about 90 nm. In addition, the window WM-2 may exhibit satisfactory folding properties by including the base layer BS made of a polymer material and the inorganic layer IL-B including both the silicon oxide and the aluminum oxide.

Hereinafter, with reference to evaluation results of windows according to Comparative Examples and Examples, a window WM according to an embodiment of the invention will be described in detail. In addition, Examples to be described below are exemplified to help understand the invention, and the scope of the invention is not limited thereto.

Tables 1 to 3 below show the results obtained by evaluating the optical and mechanical properties of the windows according to Comparative Examples and Examples. In Tables 1 to 3, a transmittance, a reflectance, and a yellow index were measured using CM-3700A (KONICA MINOLTA). The transmittance, the reflectance and the yellow index were measured using a D65 light source under a viewing angle condition of about two degrees (2°). A haze was measured by NDH200 (NIPPON DENSHOKU) using a D65 light source. The yellow index was measured by the ASTM D1925 method, and the transmittance was measured according to ISO 13468 standard.

An indentation hardness is a value measured using an indentation hardness tester. The indentation hardness was measured by applying a load of about 30 millinewtons (mN) to a sample with a loading and unloading speed of about 15 seconds(s). A value measured as the indentation hardness is a Vickers hardness (Hv) value. A pencil hardness was measured under a load of about 1 kilogram (kg) using a pencil hardness tester.

Impact resistance was evaluated using a pen drop test. The impact resistance is represented as a height in centimeters (cm) at which an upper surface of a window WM is damaged by dropping a pen of a predetermined weight to the top surface of the window WM. One end of a pen used in testing the impact resistance had a diameter of about 0.3 millimeter (mm), and a tungsten carbide-based pen having no spring was used. The pen having no spring and a weight of about 5.81 grams (g) has been used.

In Table 3, a crack strain represents an incremental extent in a size of a stretched test sample relative to an original test sample when stretching is performed. A test sample during the measurement of the crack strain was prepared by cutting into a size of about 1.0 cm×about 10 cm through laser cutting. A stretching speed was about 10 millimeters per minute (mm/min), and after performing stretching, the occurrence of a crack was observed with a microscope, and in this case, an incremental extent in the size of the sample was confirmed and evaluated.

For room-temperature folding properties, the windows according to Comparative Examples and Examples were repeatedly folded about 200,000 times at room temperature, and then a good state was evaluated as "OK"; and for high-temperature high-humidity folding properties, the windows according to Comparative Examples and Examples were repeatedly folded about 150,000 times under a condition of about 60 degrees Celsius (C) and about 93 percent (%) humidity, and then a good state was evaluated as "OK".

In Tables 1 to 3, Comparative Example 1 is a window WM which is prepared without an inorganic layer, and corresponds to a polyethylene terephthalate (PET) film, and the window WM according to Comparative Example 1 has a thickness of about 50 μm. In Tables 1 and 2, Comparative Example 2 is a widow WM including a base layer BS and an inorganic layer IL-U, in which a polyethylene terephthalate (PET) film having a thickness of about 50 μm is used as the base layer BS, and the inorganic layer IL-U has a thickness of about 30 nm and includes only silicon oxide.

Table 1 shows the results obtained by evaluating the optical properties and durability of a window WM according to a content ratio of aluminum oxide to silicon oxide in an inorganic layer IL-U. Examples 1-1 to 1-3 and Experimental Example 1-1 shown in Table 1 correspond to Examples of the windows, each of which includes an inorganic layer IL-U disposed on one surface of a base layer BS, illustrated in FIG. 5 and the like. In Examples 1-1 to 1-3, and Experimental Example 1-1, evaluation was performed by varying a content of aluminum oxide with respect to silicon oxide in the inorganic layer IL-U. In Experimental Example 1-2, the content of the aluminum oxide with respect to the silicon oxide is greater than about 10 wt %, and in this case, the physical properties of the window WM were not evaluated because it was not easy to form a composition for forming the inorganic layer or to form the inorganic layer by providing the formed composition to the base layer BS. In Examples 1-1 to 1-3 and Experimental Example 1-1, a polyethylene terephthalate (PET) film having a thickness of about 50 μm has been used as a base layer BS, and in Examples 1-1 to 1-3 and Experimental Example 1-1, the inorganic layer IL-U has a thickness of about 30 nm.

TABLE 1

| Classification | Comparative Example 1 | Comparative Example 2 | Experimental Example 1-1 | Example 1-1 | Example 1-2 | Example 1-3 | Experimental Example 1-2 |
|---|---|---|---|---|---|---|---|
| Mixing ratio (wt %) of $Al_2O_3$ | — | 0 | <1 | 2~3 | 5~6 | 7~9 | >10 |
| Transmittance (%) | 91 | 91.4 | 91.5 | 92.1 | 92.0 | 91.8 | Unassessable |
| Reflectance (%) | 5.6 | 5.6 | 5.4 | 4.8 | 4.9 | 5.1 | |
| Yellow index | 1.73 | 2.75 | 1.85 | 1.75 | 1.84 | 1.85 | |
| Haze (%) | 1.50 | 1.00 | 1.38 | 1.27 | 1.39 | 1.42 | |
| Indentation hardness (Hv) | <27 | 27~28 | 27.1 | 26.9 | 26.8. | 26.5 | |
| Impact resistance (cm) | 3 | <4 | ≥4 | ≥4 | <4 | <4 | |

Referring to the results shown in Table 1, it may be seen that the windows according to Examples exhibit excellent optical properties and superior impact resistance properties compared to Comparative Examples. Examples 1-1 to 1-3 exhibit optical properties such as a high transmittance and a low reflectance compared to Comparative Examples 1 and 2. In addition, Examples 1-1 to 1-3 exhibit a yellow index and a haze value as similar to those of Comparative Examples 1 and 2. In addition, it may be seen that Examples 1-1 to 1-3 have low reflectance properties compared to Experimental Example 1-1.

Examples 1-1 to 1-3 exhibit improved impact resistance properties compared to Comparative Examples 1 and 2, and through comparison, Examples 1-1 to 1-3 exhibit indentation hardness values as similar to those of Comparative Examples 1 and 2.

That is, it may be confirmed that in the window WM including the inorganic layer IL-U having the silicon oxide and the aluminum oxide, the aluminum oxide is included in an amount of about 1 wt % or more and less than about 10 wt % with respect to the silicon oxide in the inorganic layer IL-U, and thus, the window WM exhibits both excellent optical properties and superior impact resistance.

Table 2 shows the results obtained by evaluating the optical properties and durability of a window WM according to Example, according to the thickness of an inorganic layer. Example 2-1 and Experimental Examples 2-1 to 2-3, shown in Table 2, correspond to Examples or Experimental Examples of the windows, each of which includes the inorganic layer disposed on one surface of the base layer BS, illustrated in FIG. 5 and the like. In Example 2-1 and Experimental Examples 2-1 to 2-3, a polyethylene terephthalate (PET) film having a thickness of about 50 μm was used as a base layer BS, and in each of inorganic layers according to Example 2-1 and Experimental Examples 2-1 to 2-3, a content of aluminum oxide is about 2 wt % to about 3 wt % with respect to silicon oxide.

TABLE 2

| Classification | Comparative Example 1 | Comparative Example 2 | Experimental Example 2-1 | Example 2-1 | Experimental Example 2-2 | Experimental Example 2-3 |
|---|---|---|---|---|---|---|
| Thickness of inorganic layer(nm) | — | 30 | 30 | 60 | 100 | 200 |
| Transmittance (%) | 91 | 91.4 | 92.1 | 93.6 | 92.1 | 91.7 |
| Reflectance (%) | 5.6 | 5.6 | 4.8 | 3.3 | 4.7 | 5.1 |
| Yellow index | 1.73 | 2.75 | 1.75 | 0.68 | 2.39 | −0.14 |
| Haze (%) | 1.50 | 1.00 | 1.27 | 1.22 | 1.28 | 1.28 |
| Indentation hardness (Hv) | ≤27 | 27~28 | 26.9 | 26.7 | 27.3 | 28.5 |
| Impact resistance (cm) | 3 | <4 | ≥4 | ≥4 | ≥4 | ≥4 |

Referring to the results shown in Table 2, it may be seen that the window WM according to Example 2-1 exhibits excellent optical properties and superior impact resistance properties compared to Comparative Examples. It may be seen that the window WM according to Example 2-1 also exhibits excellent optical properties compared to Experimental Examples 2-1 to 2-3.

Example 2-1 exhibits optical properties such as a high transmittance, a low reflectance, and a low yellow index compared to Comparative Examples 1 and 2. In addition, Example 2-1 exhibits a haze value as similar to those of Comparative Examples 1 and 2. In addition, Example 2-1 exhibits optical properties such as a high transmittance, a low reflectance, a low yellow index, and a low haze value compared to Experimental Examples 2-1 to 2-3.

Example 2-1 exhibits improved impact resistance properties compared to Comparative Examples 1 and 2, and through comparison, Example 2-1 exhibits an indentation hardness value as similar to those of Comparative Examples 1 and 2.

That is, it may be confirmed that the window WM including the inorganic layer IL-U having the silicon oxide and the aluminum oxide exhibits both excellent optical properties and superior impact resistance when the inorganic layer has a thickness of about 40 nm to about 90 nm.

Table 3 shows the results obtained by evaluating the optical properties and durability of windows according to Example 3 and Comparative Example 1, each of which has a structure of the window WM-1 illustrated in FIG. 6. In Example 3 of Table 3, a polyethylene terephthalate (PET) film having a thickness of about 50 μm was used as a base layer BS, and an upper inorganic layer IL-U and a lower inorganic layer IL-B each were formed to have a thickness of about 60 nm. The upper inorganic layer IL-U and the lower inorganic layer IL-B each have aluminum oxide included in an amount of about 2 wt % to about 3 wt % with respect to silicon oxide.

TABLE 3

| Classification | Comparative Example 1 | Example 3 |
|---|---|---|
| Transmittance (%) | 91 | 91 |
| Reflectance (%) | 5.6 | 3.3 |
| Yellow index | 1.73 | 0.68 |
| Haze (%) | 1.50 | 1.22 |
| Indentation hardness (Hv) | ≤27 | ≤27 |
| Impact resistance (cm) | 3 | ≥4 |
| Crack strain (%) | ≤8 | ≥5 |
| Folding properties Room temperature | OK | OK |

TABLE 3-continued

| Classification | Comparative Example 1 | Example 3 |
|---|---|---|
| High temperature/ high humidity | OK | OK |

Referring to the results shown in Table 3, the window WM-1 according to Example 3 exhibits a low reflectance, a low yellow index, and a low haze value compared to Comparative Example 1. In addition, Example 3 exhibits transmittance properties as similar to those of Comparative Example 1. It may be confirmed that the window WM-1 according to Example 3 exhibits excellent optical properties compared to Comparative Example 1.

In addition, Example 3 exhibits improved impact resistance compared to Comparative Example 1 and exhibits indentation hardness and folding properties as similar to those of Comparative Example 1. That is, it may be confirmed that the window WM-1 according to Example 3 exhibits excellent durability properties.

Referring to the results shown in Tables 1 to 3, it may be confirmed that the window WM including the inorganic layer having the silicon oxide and the aluminum oxide exhibits excellent optical properties, improved impact resistance, and satisfactory folding properties when the aluminum oxide is included in an amount of about 1 wt % or more and less than about 10 wt % with respect to the silicon oxide in the inorganic layer, and the inorganic layer IL-U has a thickness of about 40 nm to about 90 nm.

A window WM according to an embodiment includes a base layer BS and an inorganic layer IL-U disposed on the base layer BS, and including silicon oxide and aluminum oxide, and has the aluminum oxide which is included in an amount of about 1 wt % or more and less than 100 wt % or less with respect to silicon in the inorganic layer IL-U, thereby exhibiting excellent optical properties and superior durability. In addition, the window WM according to an embodiment may exhibit impact resistance for protecting a display module DM disposed therebelow and excellent optical properties for improving display quality of the display module DM while having flexibility required for a flexible electronic device.

An electronic device ED according to an embodiment includes a window WM including an inorganic layer IL-U having silicon oxide and aluminum oxide, thereby exhibiting excellent durability and superior folding properties while having excellent optical properties. In addition, an electronic device ED according to an embodiment, which includes a window WM that exhibits excellent optical properties by including an inorganic layer IL-U having silicon oxide and aluminum oxide, may exhibit excellent display quality.

A window WM according to an embodiment includes an inorganic layer IL-U including silicon oxide and aluminum oxide, thereby exhibiting both excellent optical properties and improved impact resistance properties.

An electronic device ED according to an embodiment includes a window WM disposed on an electronic module and including an inorganic layer IL-U including silicon oxide and aluminum oxide, thereby exhibiting satisfactory display quality, improved impact resistance properties, and excellent flexibility as well.

In the foregoing description, although the embodiments of the invention have been described with reference to embodiments of the invention, it would be understood that various changes and modifications can be made to the invention by one ordinary skilled in the art within the spirit and scope of the invention as hereinafter claimed.

Accordingly, the technical scope of the invention should not be limited to the content described in the detailed description of the specification, but should be defined by the claims.

What is claimed is:

1. A window comprising:
    a base layer;
    a first outer surface which is furthest from the base layer in a first direction along a thickness direction of the base layer; and
    a plurality of layers which is between the base layer and the first outer surface, the plurality of layers comprising an inorganic layer including silicon oxide and aluminum oxide which is in a content of about 1 weight percent or more and less than about 10 weight percent with respect to about 100 weight percent of the silicon oxide,
    wherein among the plurality of layers, the inorganic layer which includes silicon oxide and aluminum oxide which is in the content of about 1 weight percent or more and less than about 10 weight percent with respect to about 100 weight percent of the silicon oxide defines the first outer surface.

2. The window of claim 1, wherein the inorganic layer which defines the first outer surface of the window has a thickness of about 40 nanometers to about 90 nanometers.

3. The window of claim 1, wherein the inorganic layer which defines the first outer surface of the window is directly on the base layer.

4. The window of claim 1, wherein the plurality of layers further comprises;
    a hard coating layer which faces the inorganic layer with the base layer therebetween and has a hardness which is greater than the base layer; and
    among the plurality of layers, the hard coating layer which has the hardness greater than the base layer defining a second outer surface of the window which is furthest from the base layer in a second direction opposite to the first direction.

5. The window of claim 4, wherein each of the inorganic layer and the hard coating layer is directly on the base layer.

6. The window of claim 1, wherein the plurality of layers further comprises a hard coating layer which has a hardness greater than the base layer and is between the base layer and the inorganic layer.

7. The window of claim 1, wherein the plurality of layer further comprises:
    the inorganic layer as an upper inorganic layer which is directly on an upper surface of the base layer;
    a lower inorganic layer which includes silicon oxide and aluminum oxide which is in a content of about 1 weight percent or more and less than about 10 weight percent with respect to about 100 weight percent of the silicon oxide and is directly on a lower surface of the base layer which is opposite to the upper surface of the base layer; and
    among the plurality of layers, the lower inorganic layer which includes silicon oxide and aluminum oxide which is in the content of about 1 weight percent or more and less than about 10 weight percent with respect to about 100 weight percent of the silicon oxide defining a second outer surface which is furthest from the base layer in a second direction which is opposite to the first direction.

8. The window of claim 1, wherein the base layer is a polymer film layer.

9. The window of claim 1, wherein the base layer includes polyimide, polyethylene terephthalate, polyamide, polycarbonate or triacetylcellulose.

10. The window of claim 1, wherein the base layer has a thickness of about 50 micrometers to about 100 micrometers.

11. The window of claim 1, wherein the window has a transmittance of about 90% or more in a visible light range, together with a haze value of about 1.5% or less, and a yellow index of about 2.0 or less.

12. An electronic device comprising:
    a display module; and
    a window on the display module,
    wherein the window includes
        a base layer;
        a first outer surface which is furthest from the base layer in a first direction along a thickness direction of the base layer; and
        a plurality of layers between the base layer and the first outer surface, the plurality of layers comprising an inorganic layer including silicon oxide and aluminum oxide which is in a content of about 1 weight percent or more and less than about 10 weight percent with respect to about 100 weight percent of the silicon oxide,
        wherein among the plurality of layers, the inorganic layer which includes silicon oxide and aluminum oxide which is in the content of about 1 weight percent or more and less than about 10 weight percent with respect to about 100 weight percent of the silicon oxide defines the first outer surface.

13. The electronic device of claim 12, wherein the inorganic layer which defines the first outer surface of the window has a thickness of about 40 nanometers to about 90 nanometers.

14. The electronic device of claim 12, wherein the plurality of layers further comprises:
 a hard coating layer which faces the inorganic layer with the base layer therebetween and has a hardness which is greater than the base layer, and
 among the plurality of layers, the hard coating layer which has the hardness greater than the base layer defining a second outer surface of the window which is furthest from the base layer in a second direction opposite to the first direction.

15. The electronic device of claim 14, wherein each of the inorganic layer and the hard coating layer is directly on the base layer.

16. The electronic device of claim 12, wherein the plurality of layers further comprises a hard coating layer which has a hardness greater than the base layer and is between the base layer and the inorganic layer.

17. The electronic device of claim 12, wherein the base layer is a polymer film including polyimide, polyethylene terephthalate, polyamide, polycarbonate or triacetylcellulose.

18. The electronic device of claim 12, further comprising a protective layer facing the display module with the window therebetween,
 wherein the protective layer includes polymer resin of polyethylene terephthalate, polybutylene terephthalate, polyethylene naphthalene, polycarbonate, polymethyl methacrylate, polystyrene, polyvinyl chloride, polyether sulfone, polypropylene, polyamide, polyphenylene ether, polyoxymethylene, polysulfone, polyphenylene sulfide, polyimide, polyethyleneimine, polyetheretherketone, polyamideimide, polyarylate or thermoplastic polyurethane.

19. An electronic device comprising:
 a folding region at which the electronic device is foldable, and a non-folding region which is adjacent to the folding region;
 a display module;
 a support module disposed below the display module; and
 a window on the display module,
 wherein the window includes
  a base layer;
  an outer surface which is furthest from the base layer in a first direction along a thickness direction of the base layer; and
  a plurality of layers between the base layer and the outer surface, the plurality of layers comprising an inorganic layer including silicon oxide and aluminum oxide which is in the content of about 1 weight percent or more and less than about 10 weight percent with respect to about 100 weight percent of the silicon oxide, together with a thickness of about 40 nanometers to about 90 nanometers,
  wherein among the plurality of layers, the inorganic layer including silicon oxide and aluminum oxide which is in the content of about 1 weight percent or more and less than about 10 weight percent with respect to about 100 weight percent of the silicon oxide, together with the thickness of about 40 nanometers to about 90 nanometers, defines the outer surface.

20. The electronic device of claim 19, wherein the window has a transmittance of about 90% or more in a visible light range, together with a haze value of about 1.5% or less, and a yellow index of about 2.0 or less.

* * * * *